US010588457B2

(12) United States Patent
Hingorani (10) Patent No.: US 10,588,457 B2
(45) Date of Patent: Mar. 17, 2020

(54) PORTABLE WOOD SMOKER

(71) Applicant: Arun Hingorani, Sterling Heights, MI (US)

(72) Inventor: Arun Hingorani, Sterling Heights, MI (US)

(*) Notice: Subject to any disclaimer, the term of this patent is extended or adjusted under 35 U.S.C. 154(b) by 525 days.

(21) Appl. No.: 15/351,625

(22) Filed: Nov. 15, 2016

(65) Prior Publication Data

US 2017/0135522 A1 May 18, 2017

Related U.S. Application Data

(60) Provisional application No. 62/255,454, filed on Nov. 15, 2015.

(51) Int. Cl.
*A47J 37/07* (2006.01)

(52) U.S. Cl.
CPC ....... *A47J 37/0763* (2013.01); *A47J 37/0786* (2013.01)

(58) Field of Classification Search
CPC ............... A47J 37/0763; A47J 37/0786; A47J 37/0713; A23B 4/044; A23B 4/052
USPC .................... 99/332, 482, 401, 446, 447
See application file for complete search history.

(56) References Cited

U.S. PATENT DOCUMENTS

| 6,035,770 A * | 3/2000 | Whitefield | A23B 4/052 |
| | | | 99/482 |
| 8,651,018 B1 | 2/2014 | Loud | |
| 2002/0166460 A1 * | 11/2002 | O'Shea | A23B 4/044 |
| | | | 99/482 |
| 2005/0051038 A1 * | 3/2005 | Bartelick | A23B 4/044 |
| | | | 99/482 |
| 2006/0027229 A1 | 2/2006 | Bass | |
| 2006/0196368 A1 * | 9/2006 | Whitmer | A23B 4/044 |
| | | | 99/482 |
| 2010/0218691 A1 * | 9/2010 | Adams | A23B 4/044 |
| | | | 99/482 |
| 2016/0360762 A1 | 12/2016 | Mann | |
| 2017/0135522 A1 * | 5/2017 | Hingorani | A47J 37/0786 |

* cited by examiner

*Primary Examiner* — Dana Ross
*Assistant Examiner* — Joseph W Iskra
(74) *Attorney, Agent, or Firm* — Jacob M. Ward; Ward Law Office LLC (57) ABSTRACT

Disclosed is a portable wood smoker for smoking a food item. The smoker includes a receptacle and at least one heating element. The receptacle includes an inner space and at least one opening member for providing access to the inner space. The inner space of the receptacle is configured to accommodate wood material. The wood material is heated using the at least one heating element to realise smoke to the food item or is used for generating smoky aroma in rooms or in closed spaces. Each heating element includes a heating portion and the heating portion is configured to be removably positioned in the inner space of the receptacle. The heating portion is configured to heat the wood material when the heating element is electrically powered. The smoker also includes a control instrument which is electrically coupled with the heating element for controlling a temperature of the heating element.

13 Claims, 6 Drawing Sheets

PORTABLE WOOD SMOKER

TECHNICAL FIELD

The present invention generally relates to smokers and, more specifically, to smokers for supplying smoke used for imparting flavor to food or for creating aroma in a store, cabin, restaurant and the like.

BACKGROUND

Typically, smoking is a process for imparting flavor to food items by exposing the food items to smoke, where the smoke can be generated from burning or smoldering of commonly used fuel materials such as wood, charcoal, propane and the like. For example, wood materials such as wood from oak tree, maple tree, apple tree, plum tree and the like, may be used as the fuel materials that are predominantly used to add flavor to the food items. Commonly smoked food items include meat such as beef, chicken, pork or any vegetables.

At present, there are different kinds of smokers available for such purposes. However, such smokers are usually attached to or used with large grills in conjunction with cooking and/or barbequing of the food items. Moreover, such smokers require a long startup time, long smoke time and increased effort is required to set up. Also, the smokers attached to the large grills require ice to cool the food items that needs to be cold smoked. Hence, there is a need for techniques to smoke the food items in an efficient and environment friendly manner.

SUMMARY

The present disclosure provides a portable wood smoker.

In an aspect, an embodiment of the present disclosure provides a portable wood smoker for smoking a food item. The smoker includes a receptacle and at least one heating element. The receptacle includes an inner space and at least one opening member for providing access to the inner space. The inner space of the receptacle is configured to accommodate wood material. Each heating element includes a heating portion configured to generate heat when electrically powered. The heating portion is configured to be removably positioned in the inner space through the at least one opening member. The heating portion heats the wood material to generate smoke for smoking the food item when the heating element is electrically powered.

In an embodiment, the receptacle is of a box shaped structure and a lid covering the inner space configured in the box shaped structure. The lid includes one or more holes (perforations) for enabling smoke generated inside the inner space to escape out through the one or more holes (perforations). The wood material may include at least one of wood pellets, blocks of wood, briquettes and or wood chips. The smoker also includes a control instrument and at least one water compartment. The control instrument may be electrically coupled with the heating element for controlling a temperature of the heating element. Alternatively or additionally, a time controlling device can be used to control heating process. The at least one water compartment is configured within the receptacle to store water for providing humidity inside the receptacle. The receptacle is configured to store the food items placed in the inner space. The one or more flanges are removably attached to the heating element. The heating portion also includes the one or more flanges and the one or more flanges are configured to heat the wood material to generate smoke.

In another aspect, an embodiment of the present disclosure provides a portable wood smoker for smoking food items. The smoker includes a receptacle and a heating element. The receptacle includes an inner space and one or more pockets. The inner space is configured to accommodate food item and the one or more pockets is configured to accommodate wood material. The heating element includes a heating portion. The heating portion is configured to generate heat when electrically powered. The heating portion is removably positioned in the one or more pockets through the openings. The heating portion heats the wood material to generate smoke within the one or more pockets when the heating element is electrically powered. Additionally or optionally, the portable wood smoker includes a time controlling device (e.g., a timer) to control a time of a heating process by the heating element.

In an embodiment, the receptacle includes one or more holes and the one or more holes is configured to the one or more pockets for enabling smoke generated inside the inner space to escape out through the one or more holes toward the food item. The smoker further includes a control instrument electrically coupled with the heating element for controlling a temperature of the heating element.

In yet another aspect, an embodiment of the present disclosure provides a portable wood smoker for smoking a food item. The smoker includes a receptacle and at least one heating element. The receptacle includes an inner space, a plurality of perforations, and at least one opening member for providing access to the inner space. The inner space is configured to accommodate wood material. Each heating element includes a heating portion configured to generate heat when it is electrically powered. The heating portion is removably positioned in the inner space through the at least one opening member. The heating portion heats the wood material to generate smoke for smoking the food item through the plurality of perforations when the heating element is electrically powered.

In an embodiment, the receptacle is of a tubular configuration with a rectangular cross section with perforations. The smoker further includes a control instrument electrically coupled with the heating element for controlling a temperature of the heating element. In an embodiment, the control instrument is configured using a time and/or temperature controlling device or processor and/or a voltage regulator.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

It should be noted that the terms "first", "second", and the like, herein do not denote any order, quantity, or importance, but rather are used to distinguish one element from another. Further, the terms "a" and "an" herein do not denote a limitation of quantity, but rather denote the presence of at least one of the referenced item.

Various embodiments disclosed herein provide a portable wood smoker for supplying smoke used for imparting flavour to food or for creating aroma in a store, cabin, restaurant and the like. Various embodiments of the portable wood smoker thereof are described herein reference to FIGS. 1A-1B to 7A-7B. For the better understanding of this invention, reference would now be made to the embodiment illustrated in the accompanying figures and description below. Further, in the following figures, the same reference numerals are used to identify the same components in various views.

Figure 1A:
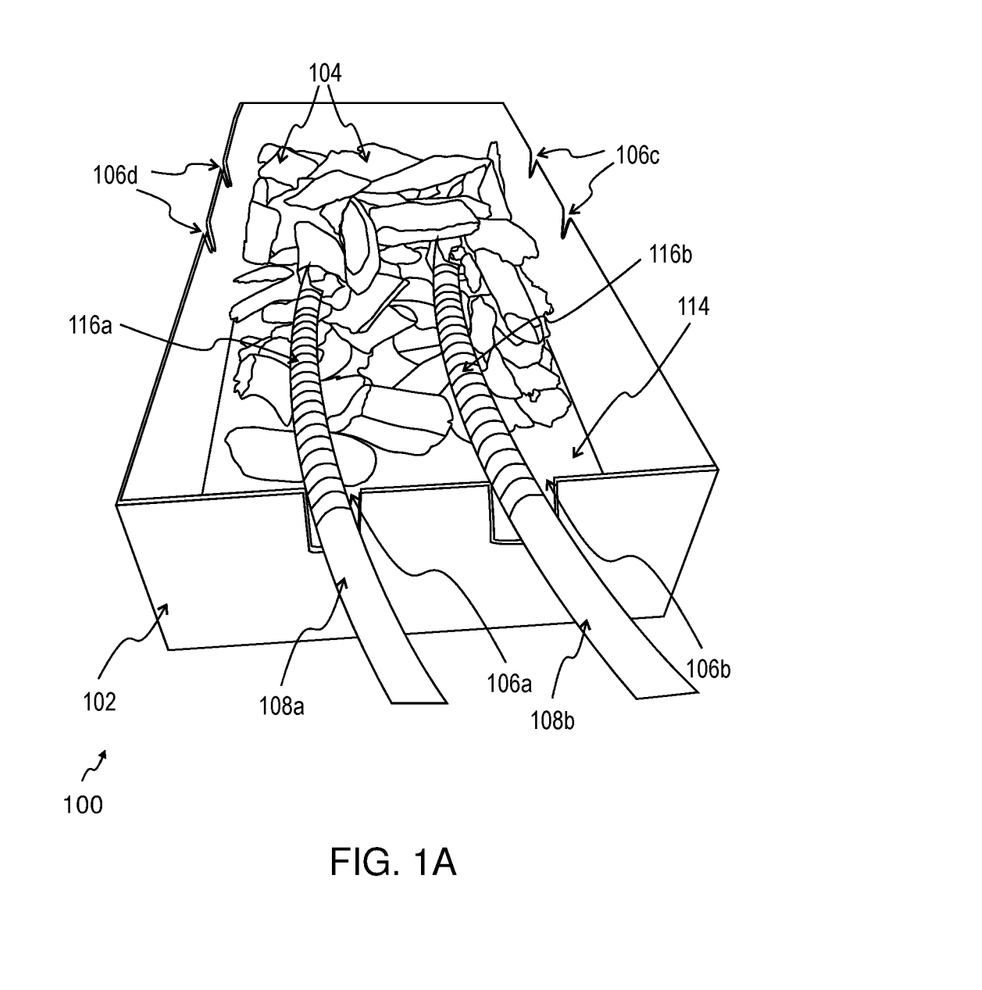
FIGS. 1A and 1B show a first perspective view and a second perspective view of a portable wood smoker respectively, in accordance with an example embodiment of the present invention.
Figure 1B:
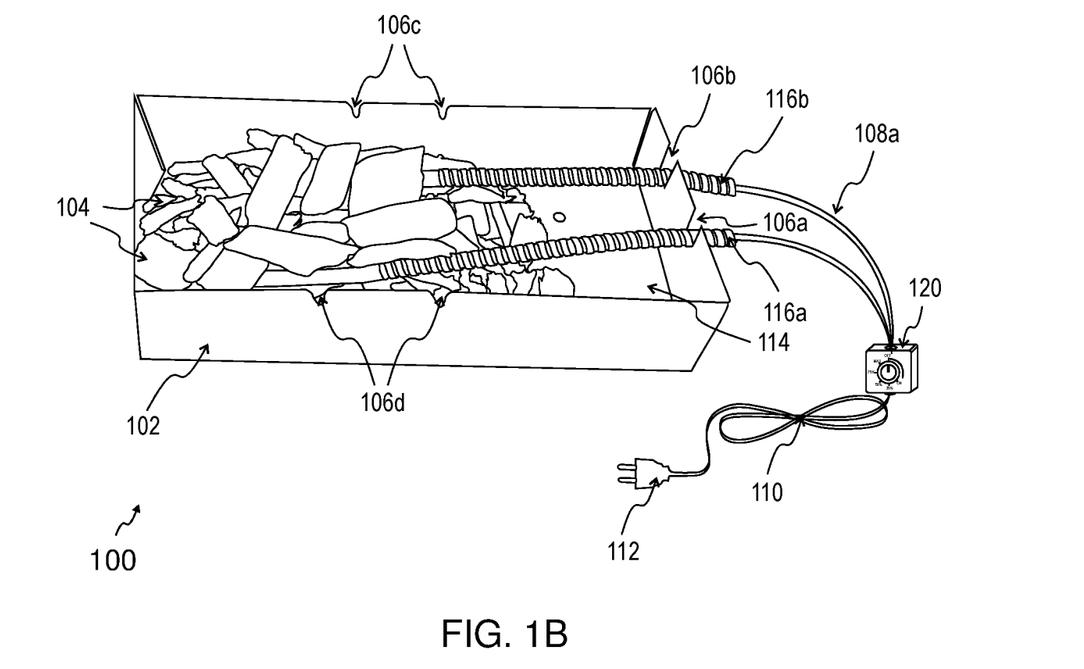

FIGS. 1A and 1B show a first perspective view and a second perspective view of a portable wood smoker 100, in accordance with an example embodiment of the present invention. As shown, the portable wood smoker 100 (hereinafter also referred as the 'smoker 100') is configured to generate smoke from various types of wood materials. The smoker 100 includes a receptacle 102 and at least one heating element 108a and 108b. The receptacle 102 includes an inner space 114 for accomodating wood material such as wood chips 104. In the illustrated figure, the receptacle 102 is of a box structure having the inner space (see, 114) to accommodate wood chips 104 within the receptacle 102. The wood chips 104 may be placed within the receptacle 102 from a top opening of the receptacle 102, which may be covered by a lid (not shown in FIGS. 1A-1B). Without loss of generality, examples of the wood chips 104 may include commonly used smoking wood from one or more trees such as oak tree, plum tree, apple tree, hickory tree, mesquite tree and the like. It is noted that the receptacle 102 is shown to hold the wood chips 104 for example purposes only, and that the receptacle 102 may include other wood materials such as but not limited to wood blocks, briquettes, wood pellets, wood dust and other similar wood materials or spices. The receptacle 102 may be made of any metal or suitable material capable of withstanding high temperatures when the wood chips 104 are heated or burned. It is understood that the receptacle 102 may be of any shape or of any size and may not be limited to shape or size as shown in FIGS. 1A and 1B. Also, the receptacle 102 may be insulated with insulating materials such as but not limited to plastic, wood, ceramic and the like for preventing any loss of heat or for providing safety for the smoker 100. In an embodiment, the receptacle 102 includes at least one provision such as opening members 106a and 106b (also referred to as 'provisions 106a and 106b') facilitated on at least one side portion of the receptacle 102 for providing access to the inner space 114. The opening members 106a and/or 106b are used for provisioning heating portions of at least one heating element to the inner space 114 of the receptacle 102.

In an embodiment, at least one heating element such as heating elements 108a and 108b may be removably supported through the provisions 106a and 106b, respectively. The heating elements 108a and 108b have respective heating portions 116a and 116b that are configured to generate heat when electrical power supply is provided to the heating elements 108a and 108b. The heating elements 108a and 108b may be removably supported using one or more retaining attachments such as but not limited to clips, holders, fasteners and the like made of metal or any other suitable material within the opening members 106a and 106b, for securing the heating portions 116a and 116b of the heating elements 108a and 108b within the inner space 114. Further, the provisions 106a and 106b may allow adjusting of the heating elements 108a and 108b to various desired angles inside the receptacle 102. In an embodiment, each of the heating elements 108a and 108b include a heating portion (e.g., heating portions 116a and 116b, respectively), placed within the inner space 114 of the receptacle 102 such that the heating portions 116a and 116b are in contact with the wood chips 104. The heating elements 108a and 108b may be placed in such a way that the wood chips 104 surround the heating portions 116a and 116b. Alternatively, at least some part of the heating portions 116a and 116b may be configured to be inserted in a block of wood or a briquette.

In an embodiment, the heating portions 116a and 116b are configured to sufficiently heat or fire up the wood chips 104 in the receptacle 102 for generating smoke. It should be noted that rear end portion of each of the heating elements 108a and 108b protruding outside the receptacle 102 may further include provisions such as wire means 110 and a plug 112 for connecting to a power supply for heating up the heating elements 116a and 116b. In an embodiment, a control instrument 120 may be connected with the heating elements 108a and 108b for regulating or controlling an incoming voltage from the power supply. The control instrument 120 may facilitate adjusting heating temperature of the heating elements 118a and 118b for desirable results. The control instrument 120 may be configured in a variety of ways. For example, the control instrument 120 can be configured using a time and/or temperature controlling device or processor and/or a voltage regulator/controller. Additionally or alternatively, the control instrument 120 can be configured using a temperature controller with a thermocouple or a thermostat or any other means of regulatory control.

It is noted that the provisions 106a and 106b and the heating elements 108a and 108b are shown here for example purposes only and that the smoker 100 may include any number of provisions for facilitating any number of heating elements. Moreover, the heating elements 108a and 108b or their heating portions 116a and 116b, respectively, may be of any shape and may incorporate flanges or extensions to increase contact area of the wood chips 104 for better results. Examples of the heating elements 108a and 108b may include, but not limited to, a straight heater (with round or flat or any other geometrical cross section), a circular heater, a disc or a plate heater and the like. In an embodiment, a heating element such as a heating element from among the heating elements 108a and 108b may be placed inside a block of wood as shown in FIG. 2.

Figure 2:
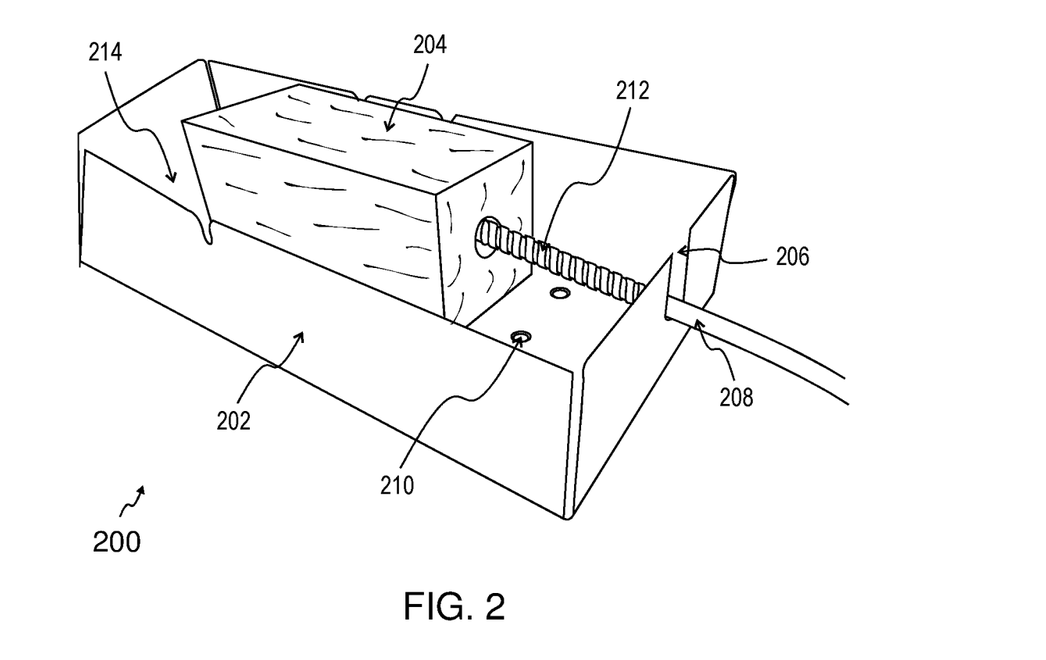
FIG. 2 shows a perspective view of a portable wood smoker in accordance with another example embodiment of the present invention.

Referring to FIG. 2, a portable wood smoker 200 is shown in accordance with an embodiment of the present invention. The portable wood smoker 200 (hereinafter also referred as the 'smoker 200') may be similar to the smoker 100 shown in FIGS. 1A and 1B. The smoker 200 includes a receptacle 202 (such as the receptacle 102 of FIGS. 1A and 1B) including an inner space 214 for accomodating wood material such as a block of wood 204. The receptacle 202 is shown to include a provision 206 (an opening member) for allowing a heating portion (see, 212) of at least one heating element such as a heating element 208 to be provisioned in the inner space 214 of the receptacle 202. The heating element 208 may be similar to the heating elements 108a and 108b, and it is used for heating the block of wood 204. A front portion i.e. the heating portion 212 of the heating element 208 provisioned within the inner space 214 of the receptacle 202 for heating purposes, is shown in FIG. 2. For instance, the heating portion 212 of the heating element 208 is inserted in the block of wood 204 (e.g., in central portion of the block of wood 204) for heating up the block of wood 204. As explained in FIGS. 1A and 1B, opposite portion (at opposite side of the heating portion) of the heating element 208 that is outside the receptacle 202, may be connected to a power supply (e.g., via the wire means 110 and the plug 112). Furthermore, the receptacle 202 may include one or more holes such as a hole 210 at a bottom portion of the receptacle 202 for cooling or ventilation purposes of the burning wood materials inside the receptacle 202.

Referring back to FIGS. 1A and 1B, in an embodiment, the smoke or fumes generated from the smoker 100 (or the smoker 200 of FIG. 2) provides a smoky aroma which may be infused to any hot or cold food items such as meat, vegetables, cheese, chips and the like, or used to impart flavor to liquid items such as spirits, natural juices and the like. For example, a food item such as a regular pizza may be cold smoked using the smoker 100 to give a smoky flavor to the regular pizza which may taste similar to a wood fired pizza. In an embodiment, the food items may be placed adjacent, above or in close proximity to the smoker 100. In an embodiment, the smoker 100 together with the food items may be enclosed in aluminium foil or placed inside a container or any suitable enclosure that can prevent the smoke/aroma emitted by the smoker 100 to escape. Further, individual food items or portions of the food items may be cold smoked separately with different smoke flavors emanated from heating up different kind of wood materials or spices. For example, the heating element 108a may be used for heating one kind of wood material such as wood from hickory tree for smoking a turkey meat and another kind of wood such as wood from manuka tree may be heated up by the heating element 108b for smoking fish meat and the like.

In another embodiment, the smoker 100 may generate smoke to provide a woodsy aroma in cabins, restaurants, outdoor stores and the like. For example, chips or blocks of rosewood may be placed in the smoker 100 and smoke may be produced by the smoker 100 to create an aroma inside a restaurant. For imparting flavor to the aforementioned liquid items, previously smoked and cooled wood material may be submerged in the liquid to impart their smoky flavor to the various liquids.

In an embodiment, the receptacle 102 (or the receptacle 202 of FIG. 2) may be covered by a lid (not shown in FIGS. 1A, 1B and 2) with one or more holes (or perforations) for allowing smoke generated inside the smoker 100 (or the smoker 200 of FIG. 2) to ventilate, for example, escape from a top portion of the receptacle 102 (or the receptacle 202 of FIG. 2). In an example, the receptacle 102 may include provisions for facilitating the lid to be placed on top portion of the receptacle 102 such as opening members 106c and 106d shown in FIGS. 1A and 1B. The smoker 100 including a lid is explained in detail with reference to FIGS. 3A and 3B.

Figure 3A:
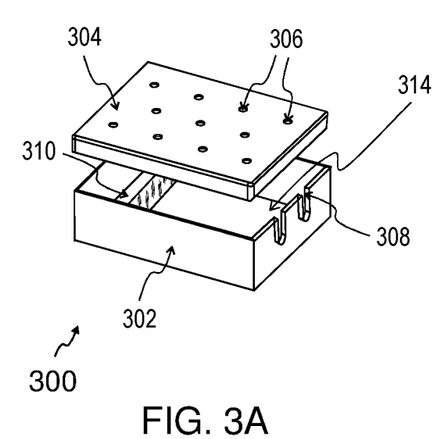
FIGS. 3A and 3B show a portable wood smoker including a lid in accordance with an example embodiment of the present invention with or without additional compartment.
Figure 3B:
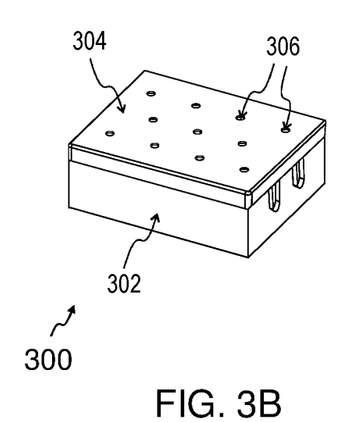

Referring to FIGS. 3A and 3B, a side view of the portable wood smoker 300 including a lid is shown in accordance with an embodiment of the present invention. The portable smoker 300 may be similar to the smokers 100 and 200 shown in FIGS. 1A-1B and 2. The portable smoker 300 (hereinafter also referred as the smoker 300) includes a receptacle 302 (similar to the receptacles 102 and 202 shown in FIGS. 1A-1B and 2). The receptacle 302 includes an inner space 314 for accomodating wood material. The inner space 314 of the receptacle 302 may be covered by a lid such as a lid 304 shown in FIGS. 3A and 3B. As best seen in FIG. 3A, there is at least one water compartment such as a water compartment 310 configured at one side within the receptacle 302. The water compartment 310 may be used for providing additional humidity inside the smoker 300. Further, the receptacle 302 may also include one or more provisions such as provision 308 for facilitating one or more heating elements (e.g., the heating elements 108a, 108b and 208 explained with reference to FIGS. 1A, 1B and 2) to be provisioned within the inner space 314.

In an example scenario, FIG. 3A depicts the receptacle 302 and the lid 304 in an open position and FIG. 3B depicts the receptacle 302 and the lid 304 in a closed position. The lid 304 may include one or more holes (or perforations) on a top portion for allowing smoke to escape from the receptacle 302 when wood chips or a block of wood are being burned inside the receptacle 302 (such as the wood chips 104 or the block of wood 204 being heated up or fired up using the heating elements 108a, 108b and 208 as shown in FIGS. 1A, 1B and 2). For example, as shown in FIGS. 3A and 3B, the lid 304 includes one or more holes 306 for allowing smoke to escape (or ventilate) from the receptacle 302 during burning of the wood material inside the receptacle 302. The smoke emitted through the holes 306 may be directed towards the food items. For example, the food items may be placed on top of the lid 304 or adjacent to the smoker 300 such that the smoke emitted during burning of the wood material inside the receptacle 302 is allowed to infuse a smoky flavor to the food items. In another example, the smoke emitted during burning of the wood material inside the receptacle 302 may be allowed to outside atmosphere for creating aroma inside a restaurant, a cabin or a store.

Figure 4:
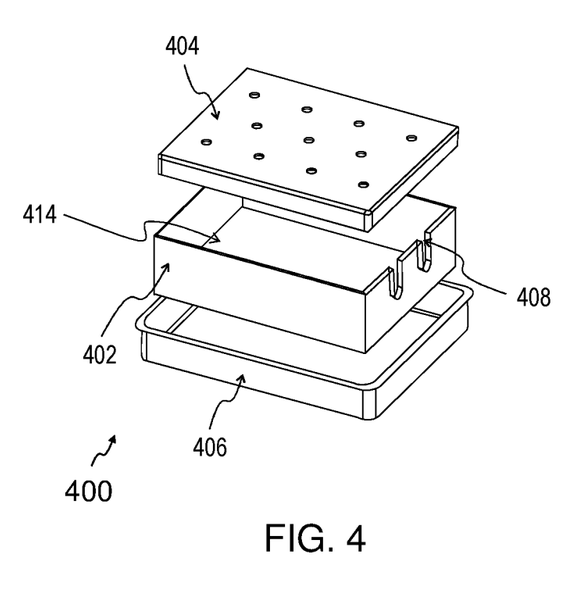
FIG. 4 shows a portable wood smoker including an additional compartment in accordance with an example embodiment of the present invention.

Referring now to FIG. 4, a side view of a portable wood smoker 400 including an additional compartment 406 is shown in accordance with another embodiment of the present invention. The portable wood smoker 400 (hereinafter referred to as the smoker 400) is shown to include a receptacle 402 including an inner space 414 and a lid 404 for closing the inner space 414 from top side of the receptacle 402 (such as the lid 304 explained with reference to FIG. 3). Further, the receptacle 402 may also include provisions such as provisions 408 (e.g., opening members) for facilitating one or more heating elements (such as the heating elements 108a, 108b, 208 explained with reference to FIGS. 1A-1B and 2) within the inner space 414 of the receptacle 402. The additional compartment 406 is configured to be attached or nested to a lower portion of the smoker 400. The additional compartment 406 may be filled with water or any other suitable liquid to provide additional humidity inside the smoker 400. In an embodiment, the additional compartment 406 may be configured to maintain an optimal smoking temperature and add moisture or coolness to the food items being cold smoked. Such addition of moisture or coolness may be obtained due to condensation of water vapour and smoke produced by the smoker 400 which adds flavor to the food items being smoked. It should also be noted that the additional compartment 406 can also serve as an insulator. The smoker 400 includes one or more holes 410 for allowing smoke to escape from the receptacle 402 during burning of the wood material inside the receptacle 402.

Figure 5:
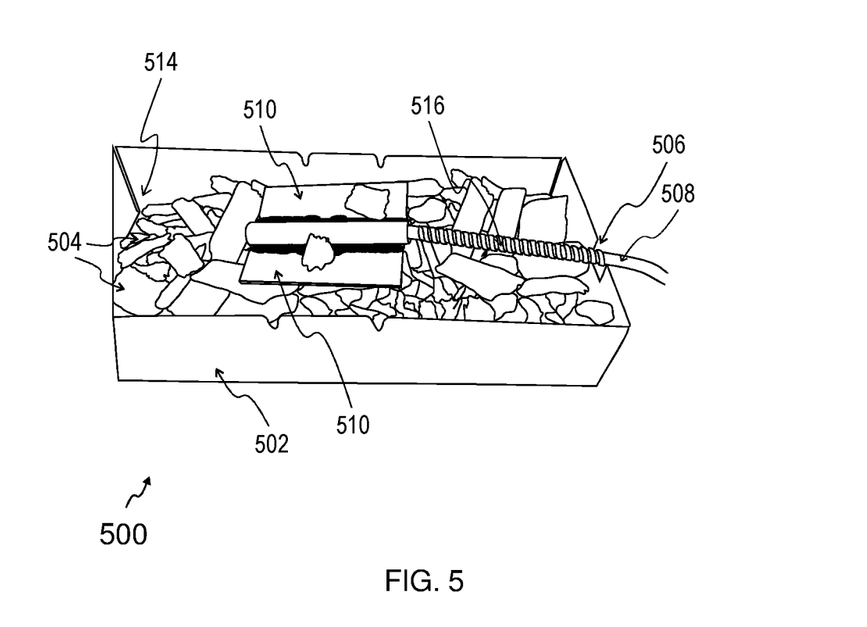
FIG. 5 shows a perspective view of a portable wood smoker in accordance with another example embodiment of the present invention.

Referring to FIG. 5, a portable wood smoker 500 is shown in accordance with another embodiment of the present invention. The portable wood smoker 500 (hereinafter also referred to as the 'smoker 500') includes a receptacle 502 (such as the receptacle 102 of FIGS. 1A and 1B) including an inner space 514 for accomodating wood chips 504. The receptacle 502 is shown to include a provision 506 (e.g., an opening member) for allowing a heating portion 516 of a heating element 508 to be provisioned in the inner space 514 of the receptacle 502. The heating element 508 is used for heating the wood chips 504, as the heating portion 516 of the heating element 508 is provisioned within the inner space 514 of the receptacle 502 for heating purposes. The heating portion 516 (i.e. front portion) of the heating element 508 may be designed in a variety of ways, for example, the heating portion 516 may include one or more flanges of any suitable shapes that can be used for heating of the wood chips 504. It will be appreciated that additional components such as flanges are removably or fixedly attached at the front portion of the heating element 508 to increase the surface area to encompass more wood materials while reducing the number of heating elements such as the heating element 508. For instance without loss of generality, as shown in FIG. 5, the front portion of the heating element 508 includes two flanges 510 as part of the heating portion 516 that increase the heating surface area for heating of the wood chips 504. The flanges 510 may be permanently or removably attached at the front portion of the heating element 508.

Figure 6:
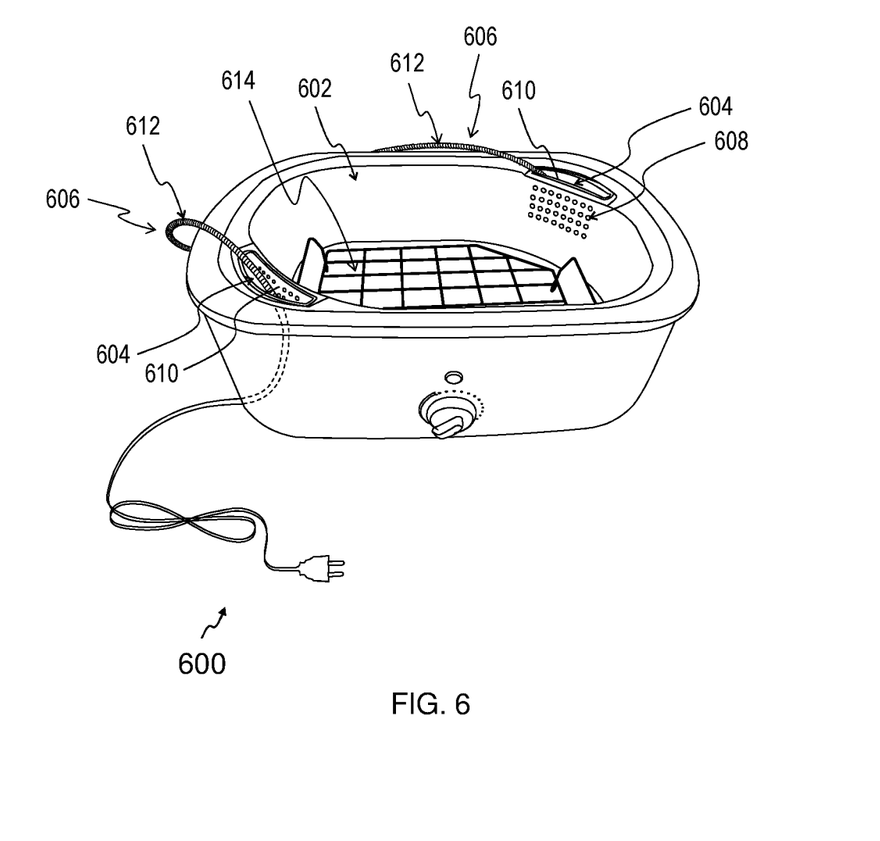
FIG. 6 shows a portable wood smoker in form of an oster roaster in accordance with another embodiment of the present invention.

Referring to FIG. 6, a portable wood smoker 600 in form of an oster roaster/smoker (hereinafter referred to as 'oster roaster/smoker 600') is shown in accordance with another embodiment of the present invention. The oster roaster/smoker 600 includes a receptacle 602 for roasting/smoking of the food items. The receptacle 602 includes an inner space 614 for accomodating food items. The oster roaster/smoker 600 further includes one or more pockets 604 in which heating portion 612 of at least one heating element 606 is provisioned through opening members (see, 610) of the pockets 604. Examples of the heating elements 606 may be the heating elements 108a-108b and 208 explained with reference to FIGS. 1A, 1B and 2. Wood material, for example wood chips (not shown) may be added in the one or more pockets 604 which is heated by the heating elements 606. The generated smoke can be directed to the food items within the receptacle 602 through holes 608 formed around the one or more pockets 604. It should be noted that using the heating elements 606 allows for smoking to happen at lower temperatures, which further allows for control of the smoking process at any temperature. For example, there are many instances where someone wants to slow-smoke fish at temperatures like 80F or 100F or 120F and have control over it, it will be possible with the heating elements 606 provided with the oster roaster/smoker 600. In an embodiment, oster roaster/smoker 600 includes a lid (not shown) to cover the receptacle 602, when the food item is being smoked.

Figure 7A:
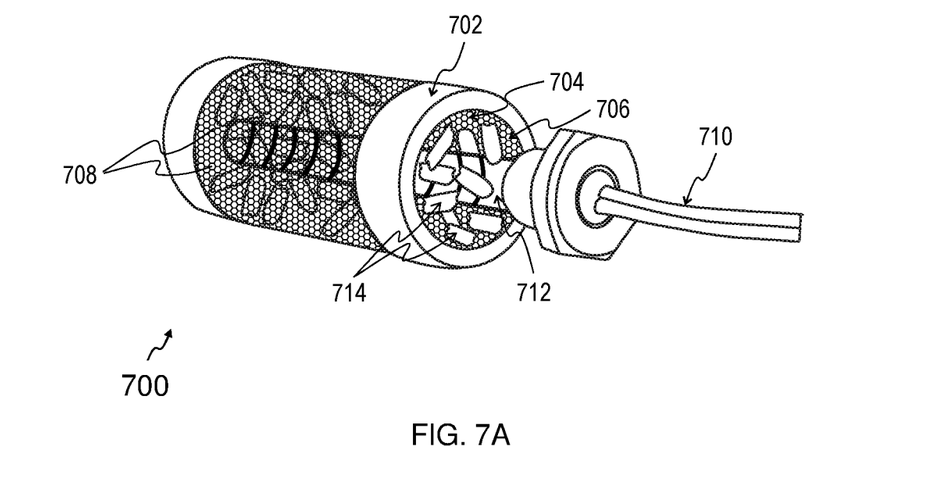
FIGS. 7A and 7B show a portable wood smoker in accordance with another example embodiment of the present invention.
Figure 7B:
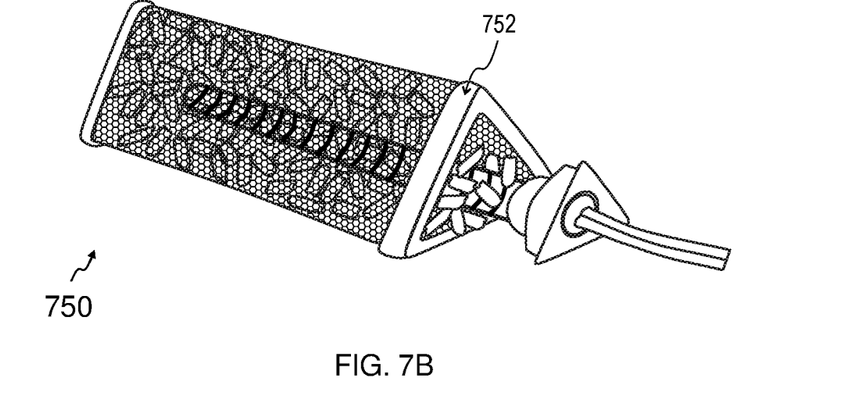

Referring now to FIGS. 7A and 7B, portable wood smokers 700 and 750, respectively are shown in accordance with another embodiment of the present invention.

Referring particularly to FIG. 7A, a receptacle 702 is shown that has an inner space 704 to accommodate wood material. The receptacle 702 is shown in form of a cylindrical structure, where one end of the receptacle 702 is closed, and the receptacle 702 includes at least one opening such as an opening 706 configured at the opposite end. It will be appreciated that the wood material for example, wood pellets 714 can be accommodated within the inner space 704. The smoker 700 includes a heating element 710 where the heating element 710 includes a heating portion 712 that can generate heat when the heating element 710 is electrically powered. The heating portion 712 of the heating element 710 can be removably positioned in the inner space 704 by inserting through the opening 706.

In the illustrated figure, the receptacle 702 includes a plurality of perforations (see, 708) for allowing smoke to escape from the receptacle 702 due to burning of the wood pellets 714 inside the receptacle 702, and the escaped smoke could be directed to the food items kept in the vicinity of the smoker 700. In the illustrated FIG. 7A, the perforations 708 is configured on an entire surface of the receptale 702, however, it should not be considered as limiting, and it could be configured in a limited surface area of the receptacle 702, and even the size of the perforations 708 can vary.

The receptacle 702 can be configured in a variety of ways with primary objective of including an inner space for wood material (e.g., wood pellets 714), and provisions (such as opening 706) for enabling the heating portion 712 to be removably positioned in the inner space 704 to heat the wood material. For example, the smoker 750 is shown in FIG. 7B that includes a receptacle 752 having a triangular cross section. Similarly, other configurations of receptacles with cross sections such as square, rectangular, etc, or even an envelope shaped receptacle can also be used in the smokers in some embodiments of the present invention.

Various embodiments of the present invention (explained in conjunction with FIGS. 1A-1B to 7A-7B) provide portable wood smokers that are compact, stand-alone smokers using small amount of electricity to smoke the food items in a matter of few minutes. The smoker requires very less start up time, smoke time and effort for smoking any hot or cold food items. The smoker can be used to smoke small or large food items and does not need any messy charcoal or propane based fuels which are harmful for the environment. Moreover, selected prime food may be cooked in an oven or a grill or using any cooking method and the food can be cold smoked separately without having to rely on a smoker-grill combination. Further, individual portions of food may be cold smoked separately with different smoke flavors emanated from wood such as hickory, mesquite, applewood and the like in a short period of time. Furthermore, the woodsy aroma obtained from the smoke may also be used to create a fragrant environment in a cabin, a restaurant, or a store. Also, in the portable wood smokers of the present invention, use of ice or liquid smoke is not necessary for cooling the food items that needs to be cold smoked. Summarizing all the above advantages, the smoker is user friendly, environment friendly, inexpensive and has flexible uses.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

What is claimed is:

1. A portable wood smoker for smoking an item, the portable wood smoker comprising:
   a receptacle having a side wall and a base wall that together define an inner space of the receptacle, the inner space having a rectangular cross-section and configured to accommodate wood material, the inner space accessible via a major opening in the receptacle, the major opening configured to receive the wood material therethrough, and the receptacle further having a side opening formed in the side wall;
   a heating element having an elongate body removably disposed in and along a length of the inner space through the side opening of the receptacle, the heating element having a heating portion configured to generate heat when electrically powered;
   a control instrument electrically coupled with the heating element for controlling a temperature of the heating element, the control instrument having a timer to control a time of heating process; and
   a heat spreader removably disposed on an end of the elongate body of the heating portion of the heating element, the heat spreader having a receiving body disposed between a pair of planar flanges adapted to heat the wood material and generate smoke, the receiving body removably receiving the end of the elongate body of the heating portion,
   wherein the heating element and the heat spreader are together configured to heat the wood material to generate smoke for smoking the item where the heating element is electrically powered by the control instrument, and
   wherein the portable wood smoker is not disposed within a grill.

2. The portable wood smoker of claim 1, wherein the receptacle is a box shaped structure.

3. The portable wood smoker of claim 1, wherein the wood material comprises at least one of wood pellets, a briquette, a wood piece, and wood chips.

4. The portable wood smoker of claim 1, further comprising a base compartment removably receiving the base wall of the receptacle so that the receptacle is nested with the base compartment.

5. The portable wood smoker of claim 4, wherein the base compartment is further configured to store water.

6. The portable wood smoker of claim 4, wherein the base compartment is an insulator.

7. The portable wood smoker of claim 1, further comprising a lid removably disposed on the receptacle, the lid covering the major opening but not covering the side opening, and the lid having at least one hole configured to allow smoke to escape or ventilate the inner space.

8. The portable wood smoker of claim 1, wherein the item to be smoked is a food item.

9. A portable wood smoker for smoking an item, the portable wood smoker comprising:
   a receptacle having a side wall and a base wall that together define an inner space of the receptacle, the inner space having a rectangular cross-section and configured to accommodate wood material, the inner space accessible via a major opening in the receptacle, the major opening configured to receive the wood material therethrough, and the receptacle further having a side opening formed in the side wall;
   a lid removably disposed on the receptacle, the lid covering the major opening but not covering the side opening, and the lid having at least one hole configured to allow smoke to escape or ventilate the inner space;
   a base compartment removably receiving the base wall of the receptacle so that the receptacle is nested with the base compartment;
   a heating element having an elongate body removably disposed in and along a length of the inner space through the side opening of the receptacle, the heating element having a heating portion configured to generate heat when electrically powered;
   a control instrument electrically coupled with the heating element for controlling a temperature of the heating element, the control instrument having a timer to control a time of heating process; and
   a heat spreader removably disposed on an end of the elongate body of the heating portion of the heating element, the heat spreader having a receiving body disposed between a pair of planar flanges adapted to heat the wood material and generate smoke, the receiving body removably receiving the end of the elongate body of the heating portion,
   wherein the heating element and the heat spreader are together configured to heat the wood material to generate smoke for smoking the item where the heating element is electrically powered by the control instrument, and wherein the portable wood smoker is not disposed within a grill.

10. The portable wood smoker of claim 1, wherein each of the pair of flanges are disposed on a common plane.

11. The portable wood smoker of claim 1, wherein each of the pair of flanges is rectangular in shape.

12. The portable wood smoker of claim 1, wherein the timer is configured to automatically power off the heating element after a predetermined amount of time.

13. The portable wood smoker of claim 1, further comprising at least one of a temperature controlling device and a voltage regulator.

\* \* \* \* \*